(12) United States Patent
Amit et al.

(10) Patent No.: US 10,908,912 B1
(45) Date of Patent: Feb. 2, 2021

(54) TARGET INJECTION SAFE METHOD FOR DYNAMICALLY INLINING BRANCH PREDICTIONS

(71) Applicant: VMware, Inc., Palo Alto, CA (US)

(72) Inventors: Nadav Amit, Mountain View, CA (US); Frederick Joseph Jacobs, Los Gatos, CA (US); Michael Wei, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/521,407

(22) Filed: Jul. 24, 2019

Related U.S. Application Data

(60) Provisional application No. 62/871,573, filed on Jul. 8, 2019.

(51) Int. Cl.
  *G06F 9/38* (2018.01)
  *G06F 9/30* (2018.01)

(52) U.S. Cl.
  CPC ........ *G06F 9/3806* (2013.01); *G06F 9/30058* (2013.01)

(58) Field of Classification Search
  CPC ................... G06F 9/3806; G06F 9/30058
  See application file for complete search history.

(56) References Cited

U.S. PATENT DOCUMENTS

| | | | |
|---|---|---|---|
| 5,956,758 A * | 9/1999 | Henzinger | G06F 9/322 711/213 |
| 6,763,104 B1 | 7/2004 | Judkins et al. | |
| 8,312,249 B1 | 11/2012 | Trumbull | |
| 8,340,262 B1 | 12/2012 | Cermak et al. | |
| 8,406,384 B1 | 3/2013 | Tremblay et al. | |
| 8,578,355 B1 * | 11/2013 | Mars | G06F 8/443 717/153 |
| 10,698,668 B1 * | 6/2020 | Pohlack | G06F 21/572 |
| 2004/0049667 A1 * | 3/2004 | McCormick, Jr. | G06F 9/30061 712/233 |

(Continued)

OTHER PUBLICATIONS

Ayers et al., "Aggressive Inlining", PLDI '97 Proceedings of the ACM SIGPLAN 1997 conference on Programming language design and implementation, ACM SIGPLAN Notices, vol. 32, Issue 5, May 1997, pp. 134-145.

(Continued)

*Primary Examiner* — Wei Y Zhen
*Assistant Examiner* — Amir Soltanzadeh
(74) *Attorney, Agent, or Firm* — Kim & Stewart LLP

(57) ABSTRACT

A method for redirecting an indirect call in an operating system kernel to a direct call is disclosed. The direct calls are contained in trampoline code called an inline jump switch (IJS) or an outline jump switch (OJS). The IJS and OJS can operate in either a use mode, redirecting an indirect call to a direct call, a learning and update mode or fallback mode. In the learning and update mode, target addresses in a trampoline code template are learned and updated by a jump switch worker thread that periodically runs as a kernel process. When building the kernel binary, a plug-in is integrated into the kernel. The plug-in replaces call sites with a trampoline code template containing a direct call so that the template can be later updated by the jump switch worker thread.

20 Claims, 15 Drawing Sheets

(56) References Cited

U.S. PATENT DOCUMENTS

| | | | | |
|---|---|---|---|---|
| 2005/0010804 | A1* | 1/2005 | Bruening | G06F 21/52 |
| | | | | 726/1 |
| 2005/0032527 | A1 | 2/2005 | Sheha et al. | |
| 2010/0039495 | A1 | 2/2010 | Rahman et al. | |
| 2012/0271615 | A1 | 10/2012 | North | |
| 2013/0024675 | A1* | 1/2013 | Lovett | G06F 9/30054 |
| | | | | 712/233 |
| 2013/0036464 | A1 | 2/2013 | Glew et al. | |
| 2013/0044869 | A1 | 2/2013 | Citron et al. | |
| 2013/0166886 | A1* | 6/2013 | Sasanka | G06F 9/54 |
| | | | | 712/216 |
| 2015/0054910 | A1 | 2/2015 | Offen et al. | |
| 2018/0060209 | A1* | 3/2018 | Kim | G06F 11/3604 |
| 2020/0026519 | A1 | 1/2020 | Sultana et al. | |
| 2020/0192668 | A1 | 6/2020 | Newton et al. | |

OTHER PUBLICATIONS

Ivan Baev "Profile-based Indirect Call Promotion", LLVM Developers Meeting, Oct. 2015, 19 pages. https://llvm.org/devmtg/2015-10/slides/Baev-IndirectCallPromotion.pdf.

Calder et al., "Reducing Indirect Function Call Overhead in C++ Programs", POPL 94 Proceedings of the 21st ACM SIGPLAN-SIGACT Symposium on Principles of Programming Languages, Jan. 1994, pp. 397-408.

Chen et al., "AutoFDO: Automatic Feedback-Directed Optimization for Warehouse-Scale Applications", CGO '16 Proceedings of the 2016 International Symposium on Code Generation and Optimization, ACM, Mar. 2016, pp. 12-23.

Jonathan Corbet, "Finding Spectre vulnerabilities with smatch", LWN.net, Apr. 20, 2018, 6 pages. https://lwn.net/Articles/752408/.

Intel Corporation, "Intel Analysis of Speculative Execution Side Channels", White Paper, Jan. 2018, 12 pages. https://newsroom.intel.com/wp-content/uploads/sites/11/2018/01/Intel-Analysis-of-Speculative-Execution-Side-Channels.pdf.

Intel Corporation. "Retpoline: A Branch Target Injection Mitigation", White Paper, Jun. 2018, 22 pages. https://software.intel.com/security-software-guidance/api-app/sites/default/files/Retpoline-A-Branch-Target-Injection-Mitigation.pdfsource=techstories.org.

Intel Corporation. "Speculative Execution Side Channel Mitigations", White Paper, May 2018, 23 pages. https://software.intel.com/security-software-guidance/api-app/sites/default/files/336996-Speculative-Execution-Side-Channel-Mitigations.pdf.

Holzle et al,. "Optimizing Dynamically-Dispatched Calls with Run-Time Type Feedback", PLDI 94 Proceedings of the ACM SIGPLAN 1994 Conference on Programming Language Design and Implementation, ACM SIGPLAN Notices, vol. 29, Issue 6, Jun. 1994, pp. 326-336.

Andi Kleen, "Add a text_poke syscall", LWN.net, Nov. 2013, 7 pages. https://lwn.net/Articles/574309/.

Koruyeh et al., "Spectre Returns! Speculation Attacks using the Return Stack Buffer", WOOT18 Proceedings of the 12th USENIX Conference on Offensive Technologies, USENIX, Aug. 2018, pp. 1-12.

Microsoft, "Mitigating speculative execution side channel hardware vulnerabilities", Microsoft Security Response Center, Mar. 15, 2018, 14 pages. https://msrc-blog.microsoft.com/2018/03/15/mitigating-speculative-execution-side-channel-hardware-vulnerabilities/.

Martin Giles, "At Least Three Billion Computer Chips Have the Spectre Security Hole", MIT Technology Review, Jan. 2018, 16 pages. https://www.technologyreview.com/s/609891/at-least-3-billion-computer-chips-have-the-spectre-security-hole/.

Josh Poimboeuf, "[Patch v2 0/4] Static calls", Linux Kernel Mailing List, Nov. 2018, 2 pages. https://lkml.org/lkml/2018/11/26/951.

Ryan Smith, "Intel Publishes Spectre Meltdown Hardware Plans: Fixed Gear Later This Year", AnandTech, Mar. 2018, 6 pages. https://www.anandtech.com/show/12533/intel-spectre-meltdown.

Paul Turner, "Retpoline: a software construct for preventing branch-target-injection", Google, 2019, 8 pages. https://support.google.com/faqs/answer/7625886.

David Woodhouse. "[PATCH] x86/retpoline: Fill RSB on context switch for affected CPUs", Linux Kernel Mailing List, Jan. 2018, 3 pages. https://lkml.org/lkml/2018/1/12/552.

David Woodhouse, "[4.4, 13/53] x86/retpoline/entry: Convert entry assembler indirect jumps", Linux Kernel Mailing List, Jan. 2018, 4 pages. https://lore.kernel.org/patchwork/patch/876057/.

Robert L. Bernstein, "Producing Good Code for the Case Statement", Software: Practice and Experience, vol. 15(10), Oct. 1985, pp. 1021-1024.

* cited by examiner

TARGET INJECTION SAFE METHOD FOR DYNAMICALLY INLINING BRANCH PREDICTIONS

CROSS-REFERENCE TO RELATED APPLICATION(S)

This application claims the benefit of U.S. Provisional Application No. 62/871,573, filed Jul. 8, 2019, which is incorporated by reference herein.

BACKGROUND

Modern microprocessors that perform branch predictions have been found to have security vulnerabilities due to their use of speculative execution. FIG. 1A depicts an example computer system 100 whose CPUs 118a-n may have these vulnerabilities and FIG. 1B depicts the architecture of CPUs 118a-n in more detail. Features of the architecture that give rise to the vulnerability are described in reference to FIG. 1B.

Referring to FIG. 1A, computer system 100 includes a user space 102 in which one or more user processes 104a-n run, each with one or more threads 106a-n, an operating system kernel 108 that may include one or more kernel processes 110a-n with threads 112a-n and a set of page tables 114 that map virtual address spaces of the user processes to physical memory. Operating system kernel 108 operates on behalf of the one or more user processes 104a-n by receiving system calls via a system call interface 111. Hardware 116 includes one or more CPUs 118a-n, RAM 124 in which programs and data can be stored and persistent storage 126 such as hard disk drives or solid-state drives.

Each CPU 118a-n includes a cache 128, 130, which may include a first level, second level and optionally, a third level cache. Each CPU 118a-n may also include one or more processing cores 120a-n, 122a-n. CPUs 118a-n are usually superscalar (i.e., multi-issue) and deeply-pipelined.

Referring to FIG. 1B, major sections of vulnerable CPUs 118a-n include a bus unit 152 which is connected to a system bus 150, a 1st level cache 154, a 2nd level cache 156 and an optional 3rd level cache 158, a front end section 160, an out-of-order execution core 162, a retirement unit 164, a set of general-purpose registers 168, and a branch target buffer (BTB) and branch prediction unit 166.

Front end section 160 includes fetch and decode logic 170 and an execution trace cache 172. Fetch and decode logic 170 pre-fetches instructions that are likely to be executed, fetches instructions that have not already been prefetched, decodes instructions into micro-operations (micro-ops) and stores the decoded instructions into an execution trace cache 172. Assisting execution trace cache 172 and fetch and decode logic 170 are BTBs and branch prediction hardware unit 166. Branch targets are predicted by CPUs 118a-n based on their linear addresses using the branch target buffers (BTBs).

Out-of-order execution core 162 employs dynamic execution, which incorporates three functions, (1) branch prediction, (2) detection of instructions that can be executed out-of-order, and (3) speculative execution of instructions. Speculative execution refers to the CPU's ability to execute instructions that lie beyond a conditional branch or an indirect call that has not been resolved. Executing instructions that lie beyond a conditional branch is helpful to keep the pipeline full and if successful, improves the performance of CPUs 118a-n.

Retirement unit 164 receives results of the executed micro-ops from out-of-order execution core 162 and searches for completed instructions that have no data dependencies or unresolved branch predictions. When found, retirement unit 164 commits the results of these instructions to memory or general-purpose registers 168 in the order in which they were originally issued. Retirement unit 164 also keeps track of branches and sends updated branch target information to the BTBs in unit 166, which in turn assists fetch/decode logic 170.

However, the speculative execution of instructions mentioned above has side effects that can reveal private data to attackers if the speculative execution is incorrect, and the processor undoes the speculation. For example, if the pattern of memory accesses performed by such speculative execution depends on private data, the resulting state of data in 1st level cache 154 constitutes a side channel through which the attacker may be able to extract information about the private data using a timing attack, which attempts to discern the private data based on the timing of certain processing steps. Attacks of this type are called Spectre Variant 2.

To counter this type of attack, a code sequence called a 'retpoline' is employed in an operating system kernel 108, such as the Linux® kernel.

FIG. 2 depicts a flow of operation for a call to a retpoline. The retpoline code replaces a 'call % rax', which is an indirect call to the location that is computed and stored in the % rax register. In step 202, the retpoline code determines whether the contents of % rax are known (i.e., computed). If not, then a CPU 118a-n executes a 'pause' instruction in step 204 and a 'lfence' (load fence) instruction in step 206. The 'pause' instruction is used to release processor resources to a hardware simultaneous multithread (SMT) or to save power if no execution is needed. The 'lfence' instruction guarantees ordering between two loads and prevents speculative loads from passing the lfence.

When the contents of the % rax register become known, then CPU 118a-n pushes the contents of % rax onto the stack in step 208 and then executes a return in step 210 to the location that the top of the stack points to. Thus, the 'call % rax' instruction is converted into a return (ref) instruction to the location specified by % rax. The conversion from an indirect call instruction to a return instruction helps to counter a Spectre, Variant 2 type attack because the return uses a return stack buffer (RSB) instead of the BTB, which is thought to be vulnerable to the attack.

Although the retpoline defends against the Spectre, Variant 2 type attack, the retpoline may still be exposed to an attack, because in some cases, if the RSB is empty, the processor may use the BTB instead.

Other mitigation measures in new hardware or microcode can be employed. However, these mitigation measures only work when operating system kernel 108 runs on the new CPU hardware or microcode. If operating system kernel 108 is moved to older hardware (i.e., hardware or microcode lacking the mitigation measures), the mitigation measures in hardware or microcode are of no use.

Another mitigation technique is call promotion in which an indirect call is promoted to a conditional direct call.

FIG. 3 depicts a flow of operations for promoting the indirect call. In step 302, CPU 118a-n compares the target address to the contents of the % eax register. If the result is zero, as determined in step 304, CPU 118a-n calls the target address directly in step 306. If the result is not zero, as determined in step 304, CPU 118a-n performs the indirect call on the % eax register in step 308.

While promoting indirect calls reduces the chance that a processor will miss-speculate an indirect call, the promotion is costly because code size is increased and performance is reduced if infrequently used target addresses are promoted. Other limitations include: being allowed only a limited number of target addresses to promote; and being unable to predict accurately the target addresses that should be promoted because likely target addresses are determined at compile time or through the use of a profiling tool that observes an instance of a kernel that may not be representative of a later released or modified kernel. Finally, the target addresses learned by a profiling tool requires recompiling operating system kernel 108 to include them. As kernels are distributed in binary form, recompiling operating system kernel 108 is not practical.

Even binary translators or just-in-time (JIT) compilers do not adequately address Spectre Variant 2 type attacks, especially in regard to execution of an operating system kernel.

Thus, retpolines and indirect call promotion both defend against Spectre, Variant 2 type attacks, but at a high cost. The retpolines approach comes at a high performance cost because the retpoline prevents speculative execution until the branch target address (i.e., destination branch address) of the indirect call is determined. Call promotion comes at a high performance cost because code size is increased and because promotion occurs without regard to the dynamic behavior of the kernel leading to promotions of infrequently used target addresses.

Thus, it is desirable to have a solution to mitigate attacks, such as Spectre, Variant 2 type, of indirect calls but without defeating speculative execution and thus maintaining performance.

SUMMARY

One embodiment provides a method for redirecting an indirect call in an operating system kernel to a direct call. The method includes, while in a learning mode, recording, for each of one or more indirect calls, whose code has been placed with a trampoline code template containing code for a direct call, an entry in a hash table having a plurality of keys and entries, where the recorded entry is a source and destination branch address for an indirect call and a count of a number of occurrences of the source and destination branch address, and the hash table key is a bit-wise combination of the branch source address and the branch destination address. The method further includes, while in an update mode, updating, based on an entry in the hash table, a destination branch address in the direct call code of trampoline code template associated with the indirect call code, and while in a use mode, executing the trampoline code to redirect the indirect call to the updated direct call.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

One or more embodiments described below provide "jump switches," which avoid the problems with both retpolines and indirect promotion and other mitigation measures. Jump switches are code fragments, which serve as trampolines for indirect calls, where trampolines are code fragments that redirect the CPU to a different code path. Jump switches are Spectre-aware in that if a jump switch cannot promote an indirect call, then the jump switch falls back to a mitigated indirect call, such as a retpoline or hardware or microcode that provides protection.

Embodiments of jump switches include an inline jump switch (IJS) and an outline jump switch (OJS). The IJS is optimized for code size and covers most of the use cases. The OJS is used when the indirect branch has multiple target addresses, thus extending the capabilities of the IJS.

Figure 4A:
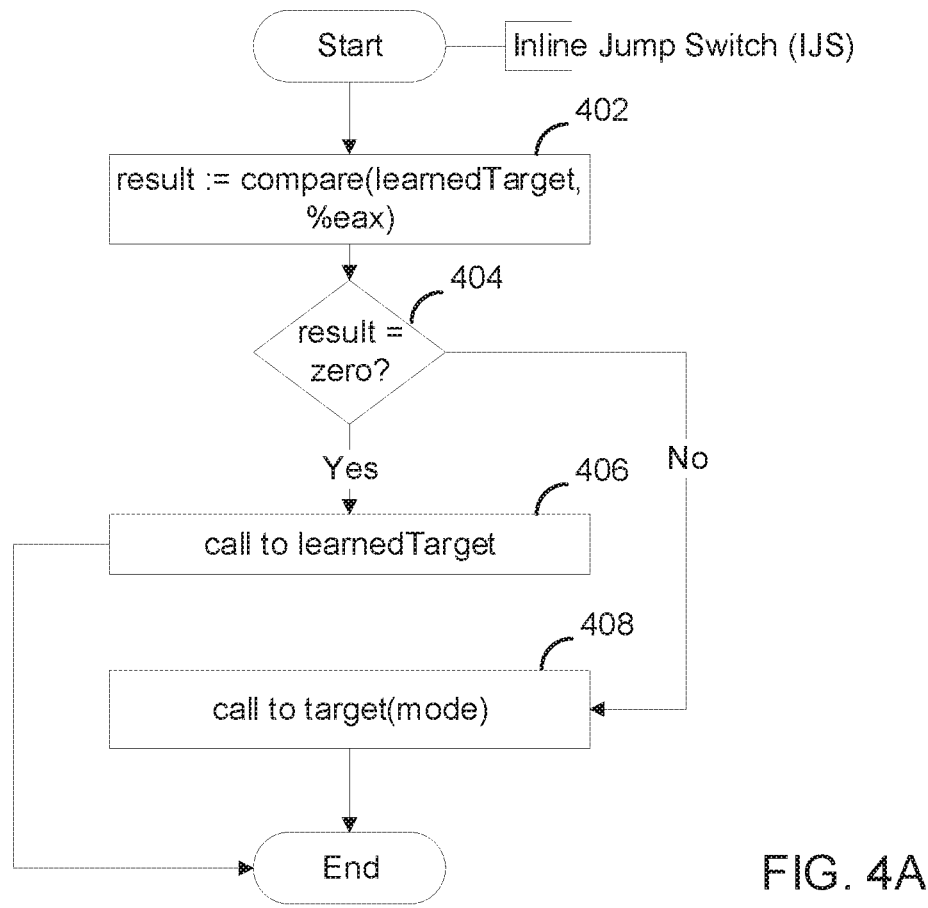
FIG. 4A depicts a flow of operations for inline jump switch (IJS), in an embodiment.
Figure 4B:
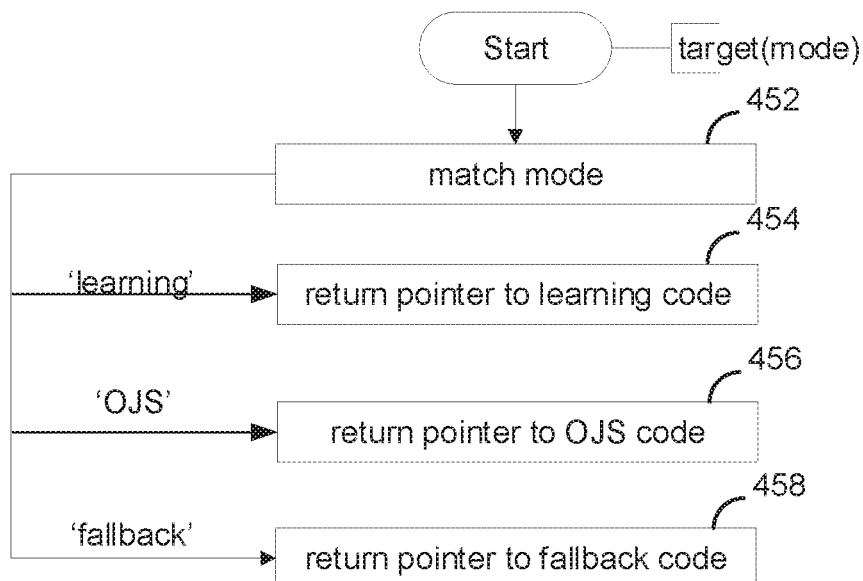
FIG. 4B depicts the target(mode) function, in an embodiment.
Figure 5:
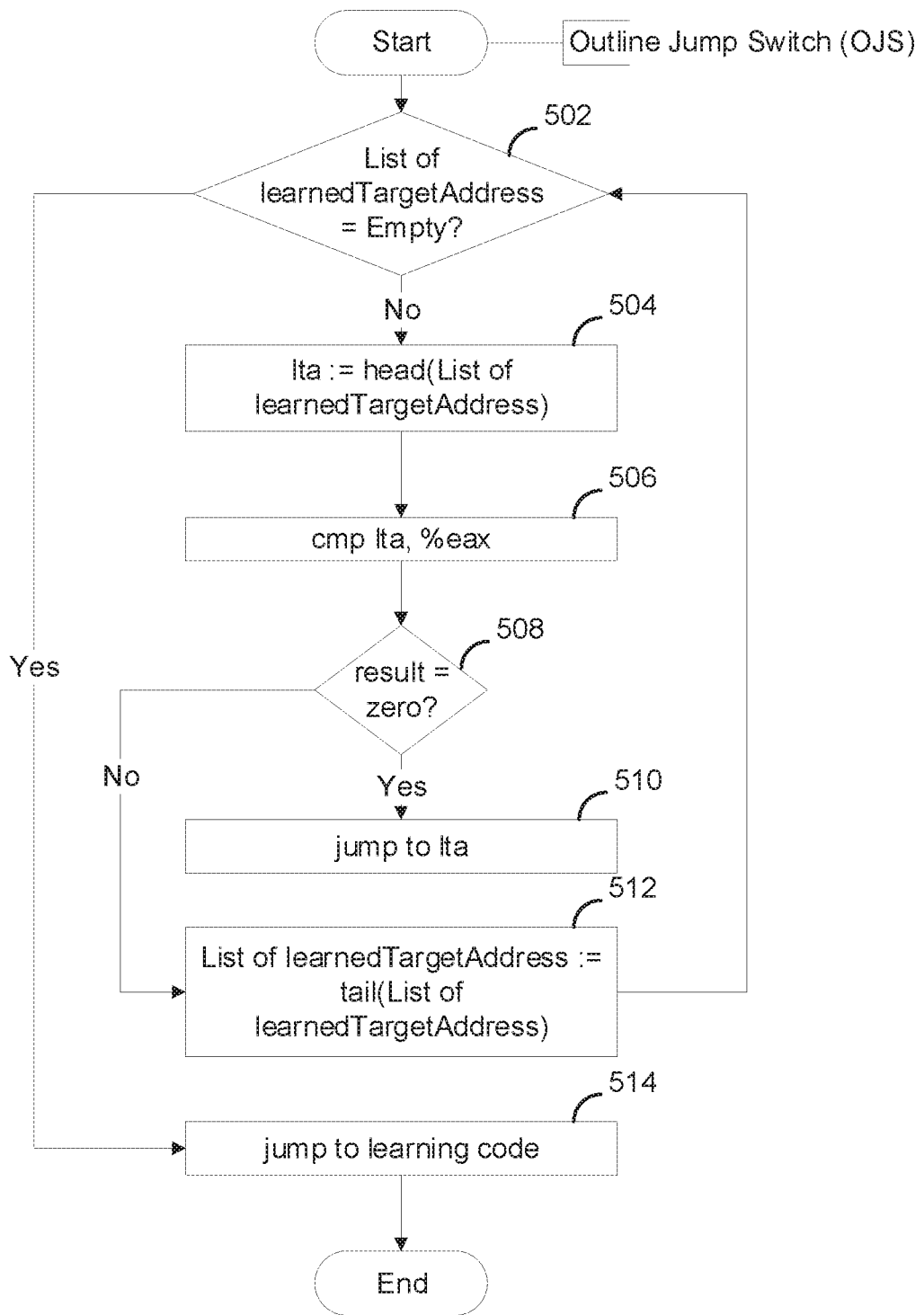
FIG. 5 depicts a flow of operations for an outline jump switch (OJS), in an embodiment.

FIGS. 4A, 4B and 5 describe a flow of operations for both an inline jump switch (IJS) and an outline jump switch (OJS).

FIG. 4A depicts a flow of operations for inline jump switch (IJS), in an embodiment. The IJS is a trampoline that replaces an indirect call. The trampoline includes steps 402 through 408. In step 402, the CPU compares a learned target with the contents of the % eax register. If the result is zero, as determined in step 404, then the CPU performs a call to the learned target in step 406. If the result is not zero, as determined in step 404, then in step 408, the CPU performs a call to a target that depends on a mode of the IJS (target(mode)), which is further described in reference to FIG. 4B. In an embodiment, the steps are implemented in x86 assembly language according to Table 1 below.

TABLE 1

| Line no. | Label | Code |
|---|---|---|
| 1 | | cmp learnedTarget, %eax |
| 2 | | jnz miss |
| 3 | | call learnedTarget |
| 4 | | jmp done |
| 5 | miss | call target(mode) |
| 6 | done | |

Figure 1A:
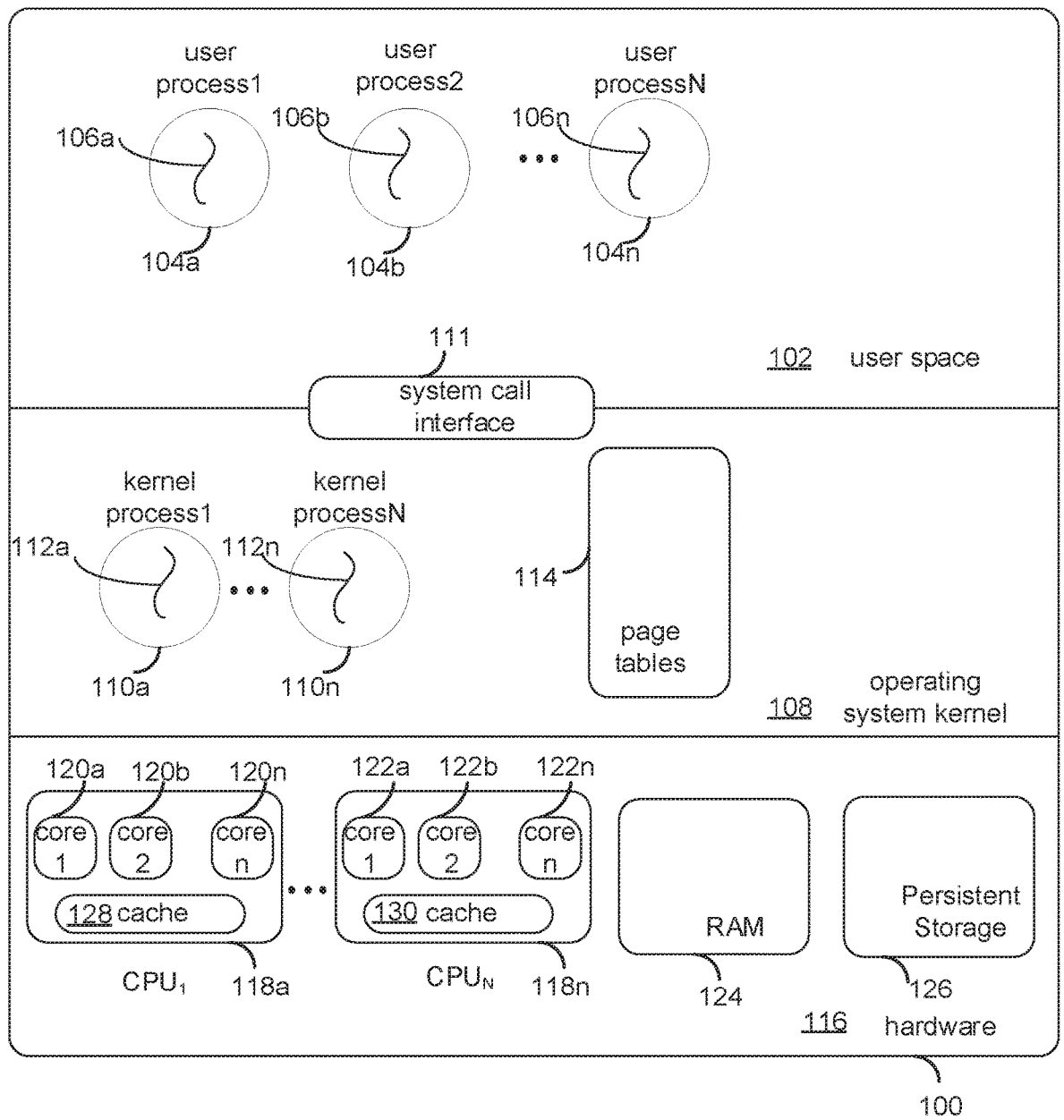
FIG. 1A depicts an example system whose CPUs may have these vulnerabilities.
Figure 1B:
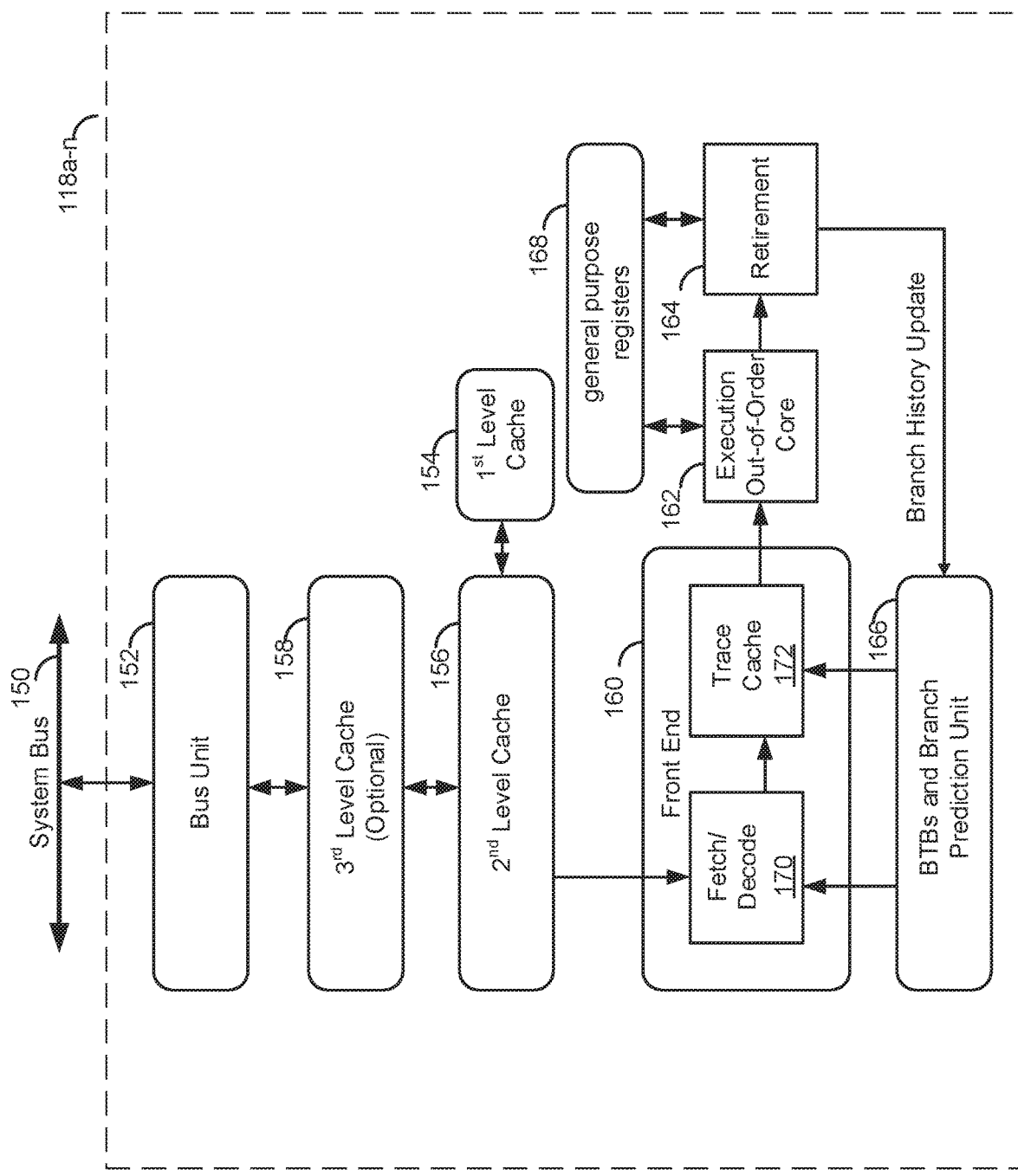
FIG. 1B depicts the architecture of the CPUs in more detail.
Figure 2:
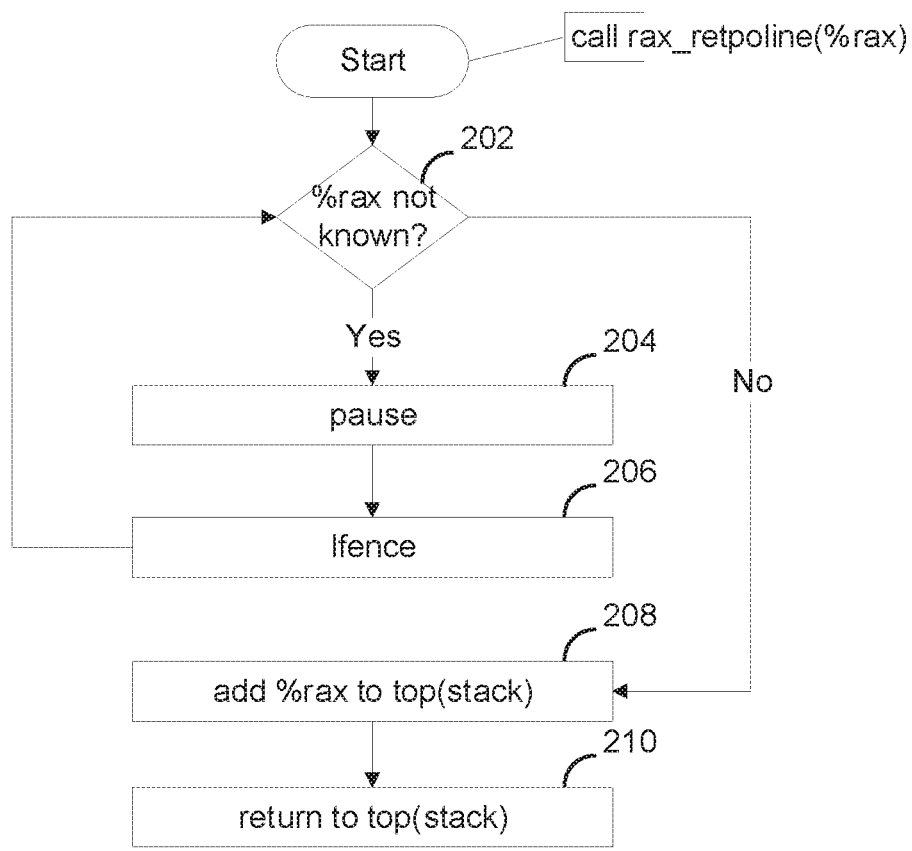
FIG. 2 depicts a flow of operations for a call to a retpoline.
Figure 3:
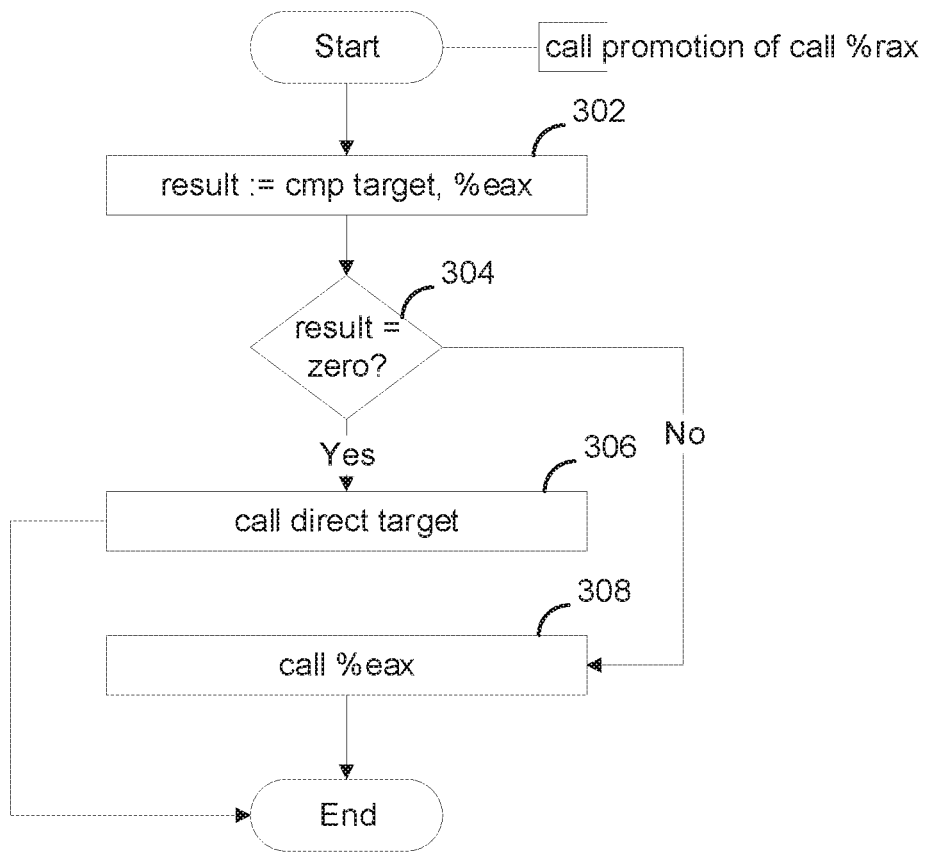
FIG. 3 depicts a flow of operations for indirect call promotion.

IJSs are short, upgradable and updatable by a jump switch worker thread 112a in FIG. 1A (described in relation to FIGS. 6-9) at runtime. The learnedTarget represents a branch target address that the IJS has learned and is promoted to avoid an indirect jump. If a miss occurs (the 'no' branch of step 404 in FIG. 4A) then the target address depends on the mode that IJS is in.

FIG. 4B depicts the target(mode) function, in an embodiment. In step 452, the mode is matched to one of three possibilities. If the mode is 'learning', then in step 454, the target address points to learning code. If the mode is 'OJS', then in step 456 the target address points to an OJS leading to more target addresses. If the mode is 'fallback', then in step 458, the target address points to either a retpoline or a normal indirect call, depending on whether the system is Spectre-vulnerable.

Initially, after compilation, the IJS is set to the fallback target by having the target address in steps 456 and 458 set to a retpoline. At runtime, worker thread 112a may patch the target addresses depending on the mode the switch is in and what target addresses have been learned by worker thread 112a.

FIG. 5 depicts a flow of operations for an outline jump switch (OJS), in an embodiment. As mentioned above, the OJS handles the case of multiple target addresses as an extension of the IJS. The multiple target addresses are learned in real-time and provided by worker thread 112a. In an embodiment, the OJS is called by the IJS, when the mode of the IJS is changed to OJS. In an embodiment, the OJS is limited to a small number of target addresses, for example, six (6) target addresses.

In step 502 of FIG. 5, the CPU determines whether a list of learned target addresses is empty or not. If not, then in step 504, the CPU obtains an item, lta, from the list and executes a comparison in step 506 of the item with the contents of the % eax register. If the results of the comparison are zero, as determined in step 508, then in step 510, the CPU jumps to the item, lta. In step 512, the CPU updates the list. The processor repeats steps 502 to 512 until the list is empty. If the list is originally empty or when the list becomes empty, the CPU executes, in step 514, a jump to an address of learning code, which is a fallback to the learning code.

In one embodiment, the steps of FIG. 5 are implemented in x86 code according to Table 2 below.

TABLE 2

| Line no. | Label | Code |
|---|---|---|
| 1 | | cmp $lta0, %eax |
| 2 | | jnz relative lta0 |
| 3 | | cmp $ltal, %eax |
| 4 | | jnz relative lta0 |
| 5 | | ... |
| 6 | | jmp learning relative |

To update the various switches, such as IJS and OJS, with learned target addresses, a worker thread 112a is employed. Worker thread 112a is a kernel process 110a that runs periodically. When worker thread 112a runs, it performs two major functions, learning new target addresses and updating the jump switches, using a hash table. The hash table is described with reference to FIG. 6A. The learning routine is described with reference to FIG. 6B. The learning routine is governed by a policy which is described with reference to FIG. 7. The switch updating is described with reference to FIGS. 8 and 9.

Figure 6A:
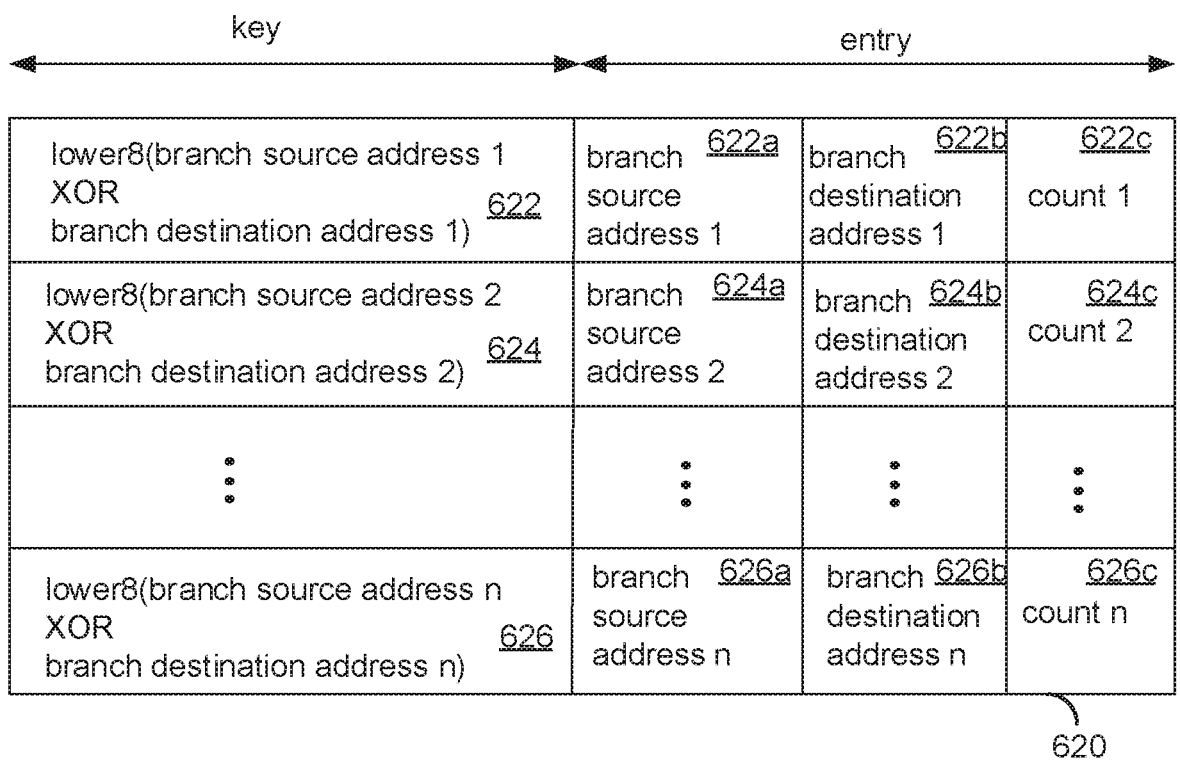
FIG. 6A depicts an example hash table, in an embodiment.

Referring now to FIG. 6A, hash table 620 is a representative one of a plurality of tables, each table being associated with one of the CPU cores 120a-n, 122a-n. In hash table 620, keys 622, 624, 626 are formed by performing a bit-wise combination of the branch source address with the branch target address and then taking the lower 8 bits of the combination. Using the lower 8 bits allows for 256 entries. In one embodiment, the bit-wise combination is a bit-wise exclusive-OR. Each entry in hash table 620 includes three items, the branch source address 622a, 624a, 626a, the branch target address 622b, 624b, 626b, and the count 622c, 624c, 626c.

Figure 6B:
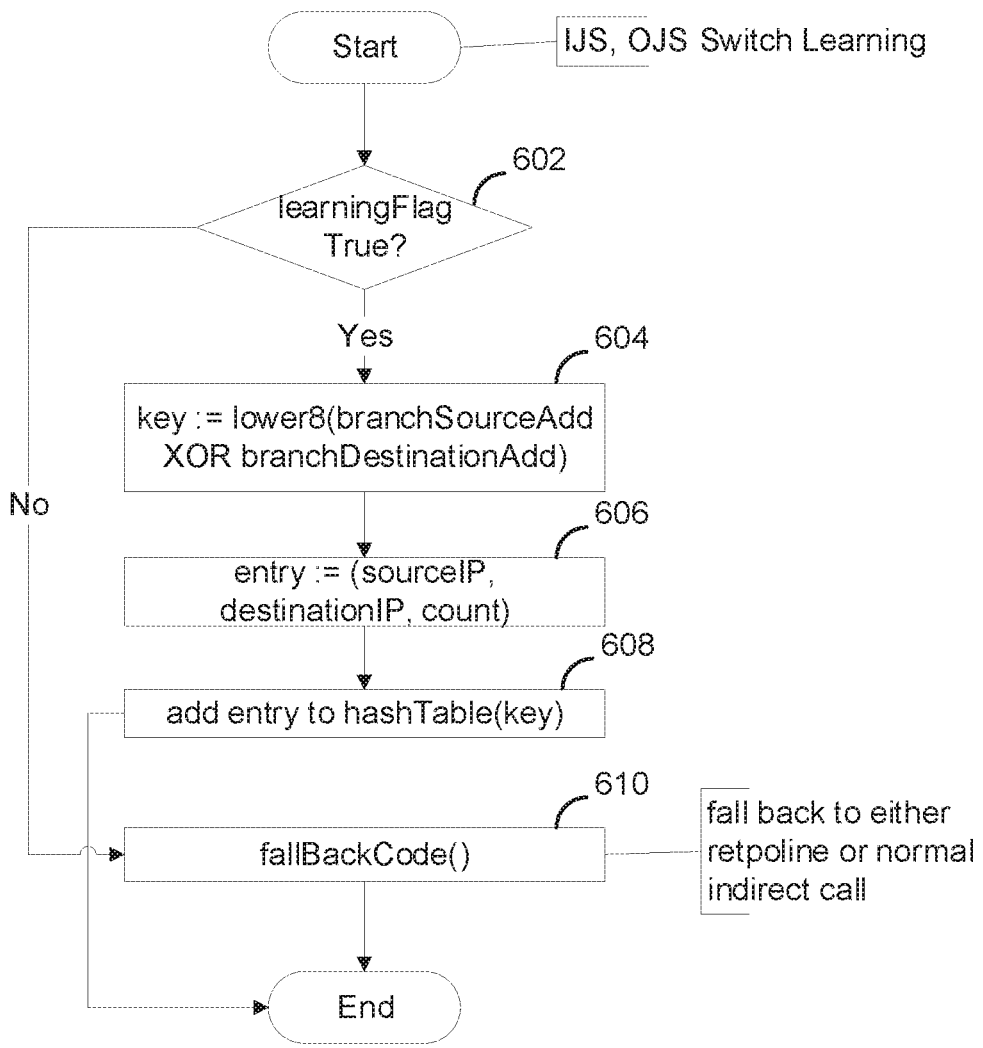
FIG. 6B depicts a flow of operations for IJS and OJS switch type learning, in an embodiment.

FIG. 6B depicts a flow of operations for IJS and OJS learning, in an embodiment. Learning occurs periodically, and when active, a learning flag is set. In one embodiment, learning occurs once every 60 seconds. In the figure, if the learning flag is true as determined in step 602, worker thread 112a in step 604 computes a key for a hash table 620 (depicted in FIG. 6A). The key is the lower eight bits of an XOR of the branch source address and the branch destination address. In step 606, worker thread 112a computes an entry for hash table 620 corresponding to the key. In one embodiment, the entry is the source instruction pointer (IP), the destination IP and a count of the number of invocations. In step 608, worker thread 112a adds the entry to hash table 620 at the computed key. When the learning is completed, the learning flag is made false, and worker thread 112a executes a fallback code function in the IJS in step 610. The fallback code may be either a retpoline if Spectre-vulnerable hardware is present or a normal indirect call.

Figure 7:
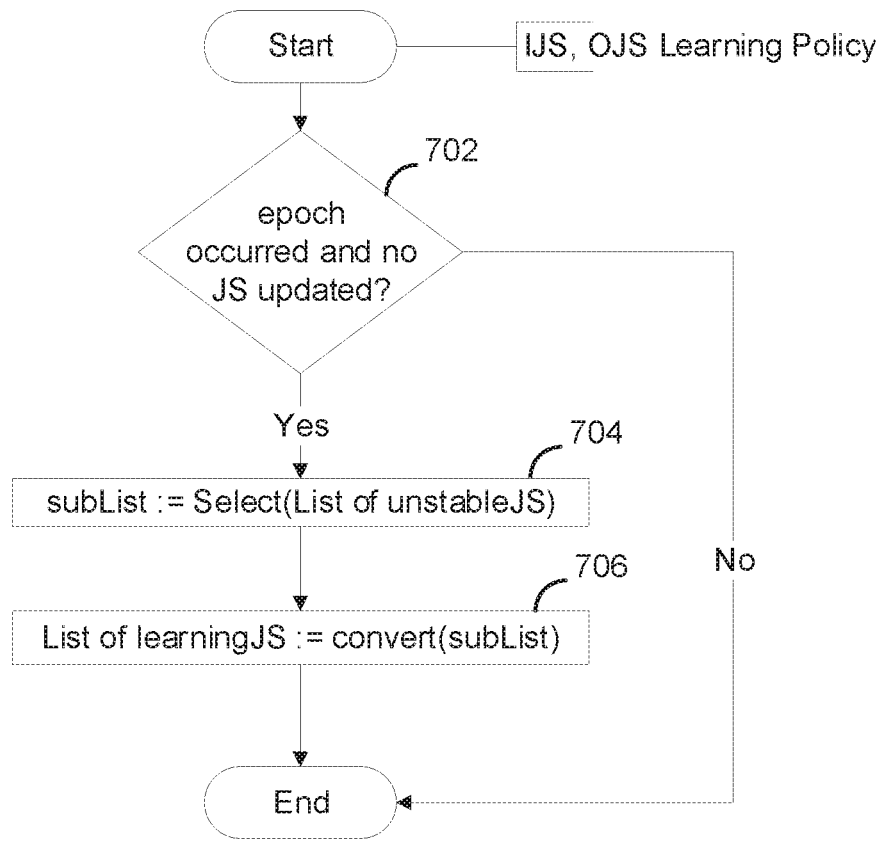
FIG. 7 depicts a flow of operations for IJS and OJS switch type learning policy, in an embodiment.

FIG. 7 depicts a flow of operations for an IJS and OJS learning policy, in an embodiment. To implement the learning policy, worker thread 112a keeps track of three lists. The first list is a list of jump switches that are in learning mode. The second list is a list of stable jump switches, i.e., those having a single target. Switches in this list need not be disabled for learning because their fallback paths are to the learning routine. The third list is a list of unstable jump switches, which includes switches with an outlined block and those that have too many target addresses and were set not to have an outlined block.

In step 702 of FIG. 7, if during an epoch (say every 60 seconds) no jump switches were updated, worker thread 112a selects a sublist of jump switches from the unstable list in step 704. In step 706, worker thread 112a converts the switches in the selected sublist to learning switches, i.e., disabling them and setting their fallback target to the learning routine.

Figure 8:
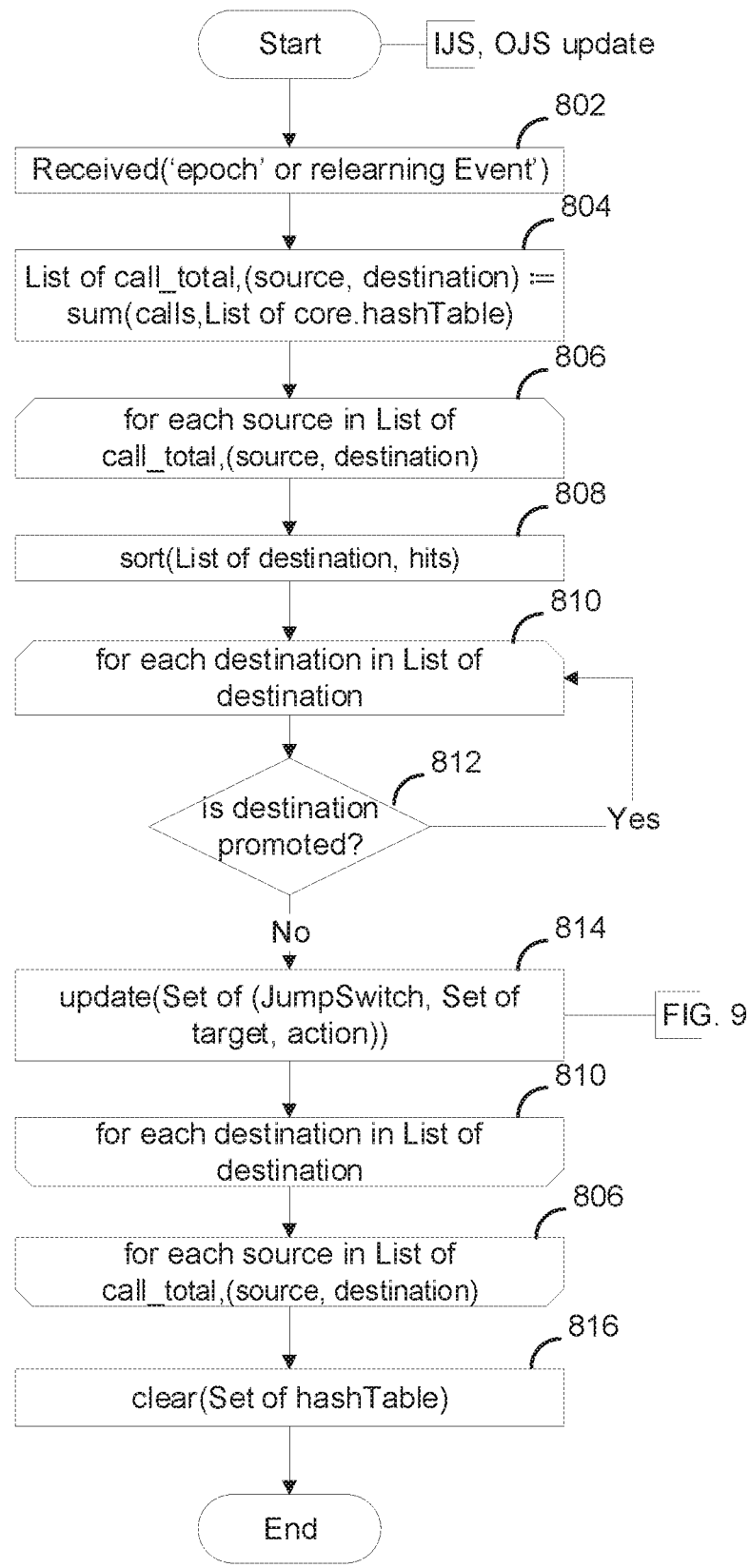
FIG. 8 depicts a flow of operations for an IJS and OJS update, in an embodiment.

FIG. 8 depicts a flow of operations for an IJS and OJS update, in an embodiment. In step 802, worker thread 112a receives an epoch or relearning event, where a relearning event is an event triggered by the user such as entering a steady system state after booting the kernel or changing the workload by starting a new process or container. In one embodiment, the epoch is one (1) second. In step 804, worker thread 112a creates a list of items, each of which is a call total and a source and destination pair over all of the CPU cores 120a-n, 122a-n. The list is created by summing calls in the hash table for each CPU core 120a-n, 122a-n. In step 806, worker thread 112a starts an iterator that runs through each source in the list. In step 808, worker thread 112a sorts the list of destinations for each source based on their hits, where a hit is a case in which the jump switch uses the target branch address that is in the hash table. In step 810, worker thread 112a starts an iterator that runs through each destination of the current source selected in step 806. If, as determined in step 812, the destination has not been promoted, then in step 814, worker thread 112a performs an action on the destination. The actions on the destination are described in more detail in reference to FIG. 9. After iterating through each source and destination in the list, worker thread 112a in step 816, clears all of the hash tables. Jump switches that are not in an update mode are in a usable mode, i.e., able to be executed.

Figure 9:
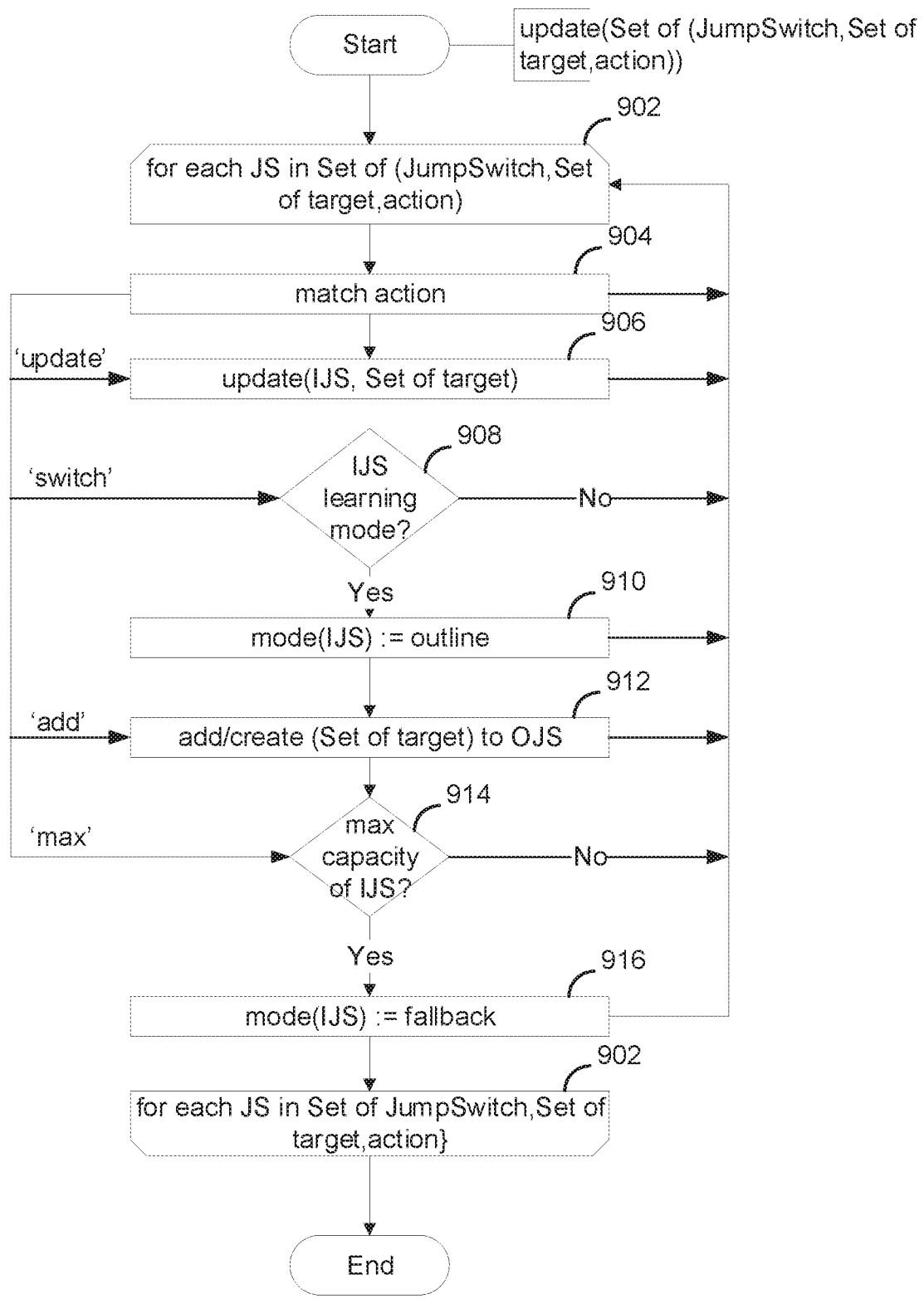
FIG. 9 depicts a flow of operations for the update function used in FIG. 8, in an embodiment.

FIG. 9 depicts a flow of operations for the update function used in FIG. 8, in an embodiment. Worker thread 112a executes the update function for each jump switch by performing an action on the jump switch which may involve a set of targets for the switch. In step 902, the function starts an iterator over the jump switches in the set passed by invoking the function. In step 904, the function matches the action for the current switch to one of four different actions. The function executes step 906, updating the IJS with one or more targets if the action is an 'update'. The function executes step 908 if the action is 'switch' and if the IJS is in learning mode, changes the mode to outline mode in step 910. The function executes step 912 if the mode is 'add' by adding or creating one or more targets for the OJS. The function executes step 914 if the action is 'max' and the capacity of an IJS is at maximum. If so, then the function, in step 916, switches the mode of the IJS to fallback mode.

Figure 10A:
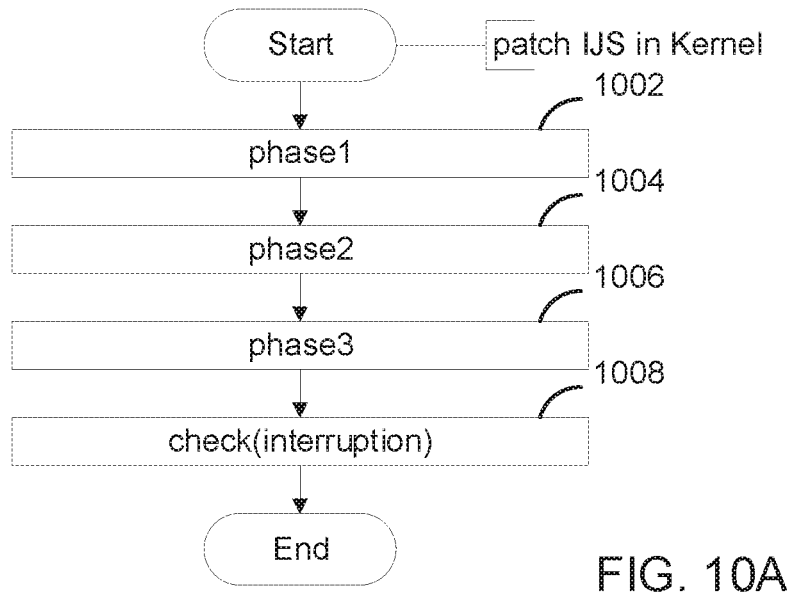
FIG. 10A depicts a flow of operations for patching the operating system kernel, in an embodiment.

FIG. 10A depicts a flow of operations for patching the operating system kernel 108 code, in an embodiment. To update a jump switch, worker thread 112a performs steps to ensure that the jump switch is safely updated. In one embodiment, the patching uses the text poke system call in the Linux® operating system, which allows the safe modification of running code.

The case of updating an IJS jump switch is depicted in FIG. 10A. As shown in the figure the patch is performed in three phases, phase1 step 1002, phase2 1004, and phase3 1006 and a final step 1008, in which check(interruption) function determines whether the kernel was preempted with a context switch during the patching.

Figure 10B:
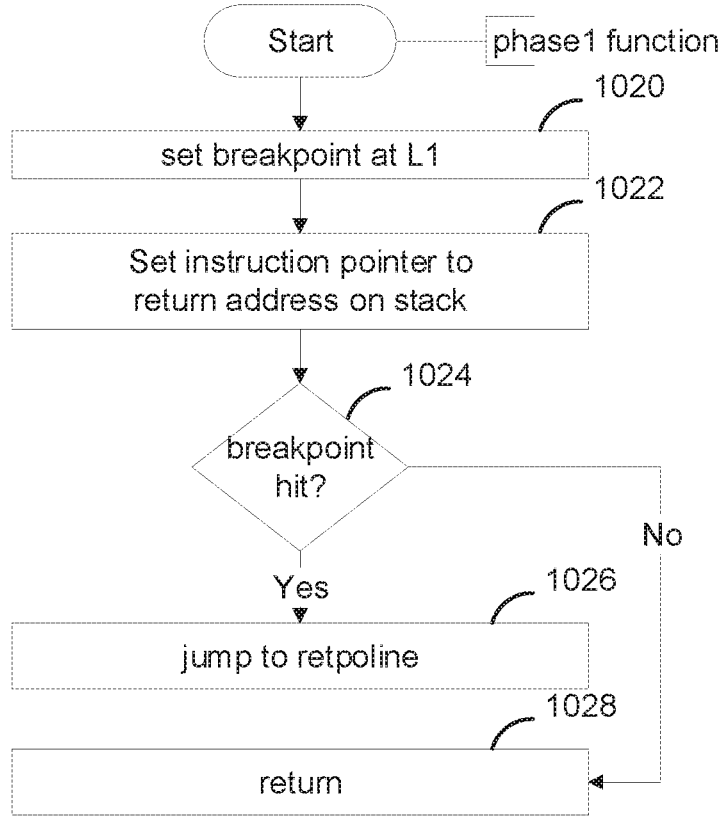
FIG. 10B depicts a flow of operations for phase 1 of patching the operating system kernel, in an embodiment.

FIG. 10B depicts a flow of operations for phase 1 of patching the operating system kernel, in an embodiment. In step 1020, the worker thread 112a sets a breakpoint at Line 1 (L1) of the IJS code in Table 1. The breakpoint is set by writing a breakpoint opcode into the first byte of the instruction at L1. In step 1022, the worker thread 112a sets the instruction pointer to the return address on the stack. If the breakpoint is hit, as determined in step 1024, the CPU jumps to the retpoline code in step 1026. If the breakpoint is not hit, then in step 1028 the phase 1 function returns.

Figure 10C:
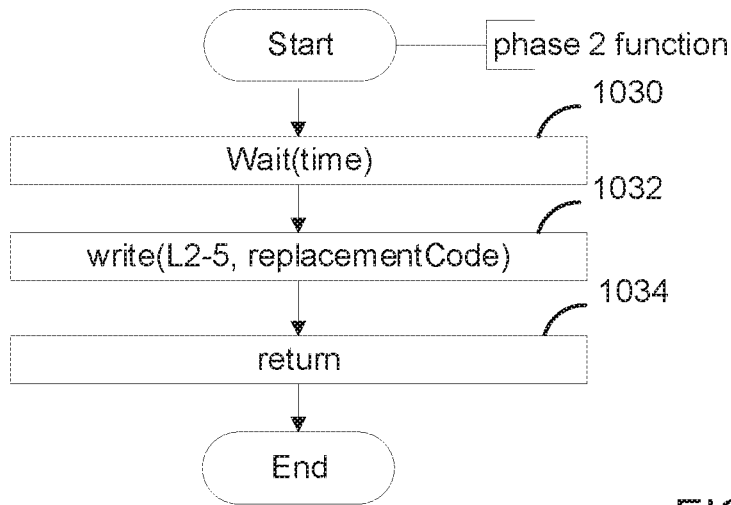
FIG. 10C depicts a flow of operations for phase 2 of patching the operating system kernel, in an embodiment.

FIG. 10C depicts a flow of operations for phase 2 of patching the operating system kernel, in an embodiment. In step 1030, the worker thread 112a waits for a quiescent period of time to ensure that no thread runs the instructions in lines 2-5. In an embodiment in which the operating system kernel is the Linux® kernel, this is performed by calling the synchronize_sched function. In step 1032, the worker thread 112a writes lines 2-5 with replacement code. In step 1034, the function returns.

Figure 10D:
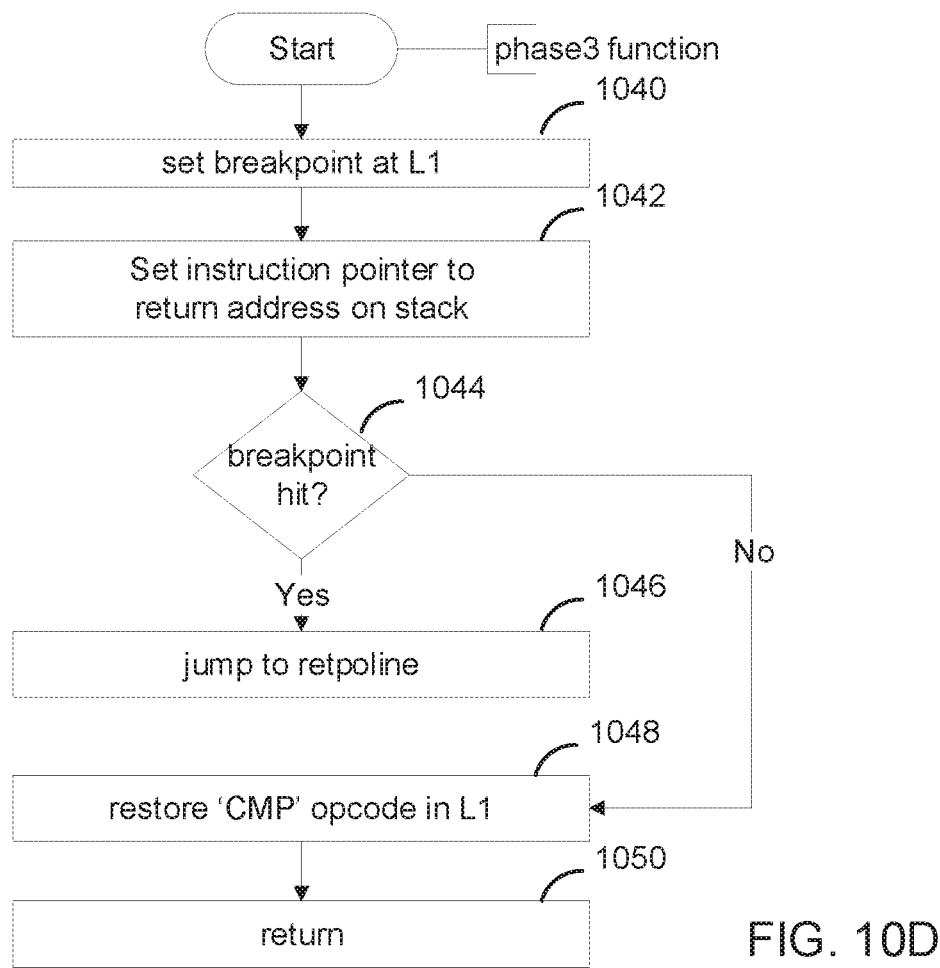
FIG. 10D depicts a flow of operations for phase 3 of patching the operating system kernel, in an embodiment.

FIG. 10D depicts a flow of operations for phase 3 of patching the operating system kernel, in an embodiment. In step 1040, the worker thread 112a sets a breakpoint at L1 and in step 1042 sets the instruction pointer to the return address on the stack. If the breakpoint is hit, as determined in step 1044, the CPU 118a-n jumps to the retpoline code. If not, then the worker thread 112a restores the 'CMP' opcode in L1 and returns in step 1050.

Figure 10E:
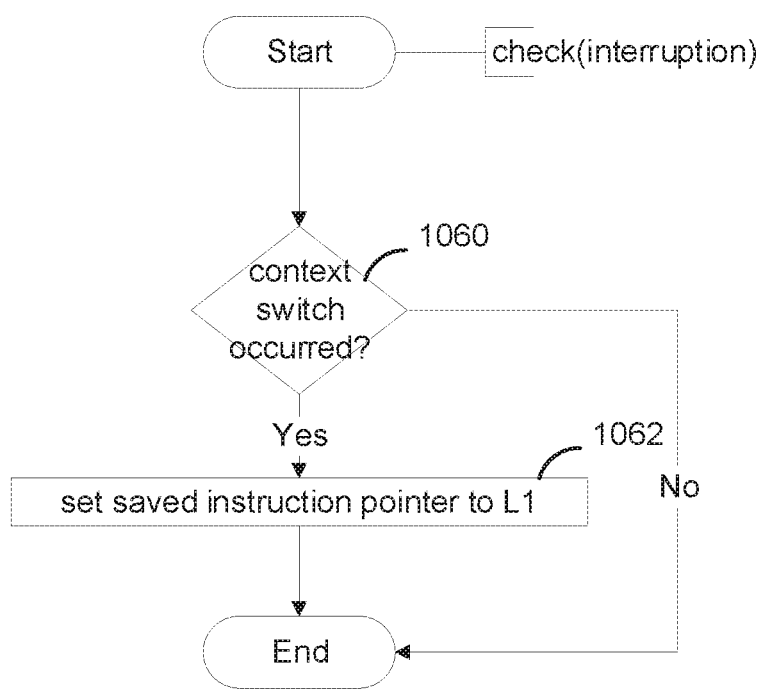
FIG. 10E depicts a flow of operations for checking an interruption while patching the operating system kernel, in an embodiment.

FIG. 10E depicts a flow of operations for checking an interruption while patching the operating system kernel, in an embodiment. If, as determined in step 1060, the operating system kernel 108 performed a context switch, then in step 1062, the saved instruction pointer (IP) is set to L1 of the code in Table 1. Setting the IP to L1 ensures that the code will be executed again when the worker thread 112a is re-scheduled.

Figure 11:
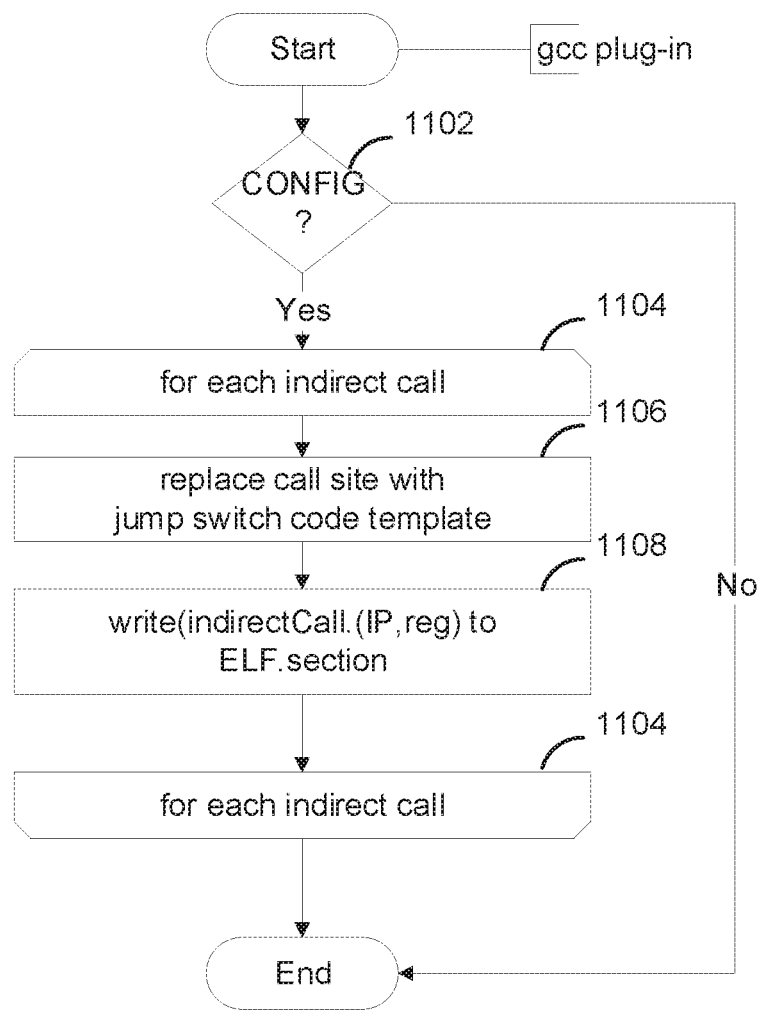
FIG. 11 depicts a flow of operations for a plug-in for an operating system compiler, in an embodiment.

FIG. 11 depicts a flow of operations for a plug-in for an operating system compiler, in an embodiment. In one embodiment, the compiler is the GNU compiler when the operating system is the Linux® operating system. The plug-in is built during a kernel build and assists in the operation of worker thread 112a.

Referring to FIG. 11, if a compiler build-option flag, CONFIG, is true, as determined in step 1102, then the compiler compiles the operating system to use jump switches according to the following steps. In step 1106, the plug-in starts an iterator over each indirect call. In step 1108, the plug-in replaces each indirect call with a jump switch code template, which contains the basic jump switch code, such as the code in Table 1, but with the jump switch set to execute only fallback code. In step 1110, worker thread 112a writes the instruction pointer (IP) and register used by the call to a new file section of a standard file format, such as an executable and linkable format (ELF) file, used by the compiler. The new section of the ELF file contains information that is read during boot of operating system kernel 108 to compose a list of calls so that worker thread 112a can easily recognize which register is used in each jump switch. The information also serves as a precaution to prevent worker thread 112a from patching the wrong code.

Worker thread 112a is integrated into operating system kernel in a manner similar to other periodic tasks which patch code such as static-keys, jump-label and alternatives infrastructure in the Linux® operating system.

Thus, jump switches are able to dynamically adapt to changing workloads and to take advantage of information only available at runtime. Jump switches are integrated into the operating system kernel, requiring no source code changes to the kernel, and designed for minimal overhead as they only operate to protect indirect calls rather than the entire binary of the operating system kernel.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of redirecting an indirect call in an operating system kernel to a direct call, the method comprising:
   while in a learning mode, recording, for each of one or more indirect calls, whose code has been replaced with a trampoline code template containing trampoline code for a direct call, an entry in a hash table having a plurality of keys and entries, wherein the recorded entry includes a source branch address and a destination branch address for an indirect call and a count of a number of occurrences of the source branch address and the destination branch address, and the hash table key is a bit-wise combination of the source branch address and the destination branch address;
   while in an update mode, updating, based on an entry in the hash table, a destination branch address in the direct call code of the trampoline code template associated with the indirect call; and
   while in a use mode, executing the trampoline code to redirect the indirect call to the updated direct call.

2. The method of claim 1, wherein the trampoline code template is installed in the operating system kernel at compile time.

3. The method of claim 1, wherein the learning mode is operative in response to an epoch event that occurs once every sixty seconds.

4. The method of claim 1, wherein the update mode is operative in response to an epoch event that occurs once every second.

5. The method of claim 1, wherein the trampoline code has fallback code which allows the trampoline code to operate as an indirect call.

6. The method of claim 1, wherein the trampoline code has fallback code which allows the trampoline code to operate as a retpoline, which is a return trampoline that prevents speculative execution until the destination branch address of the indirect call is determined.

7. The method of claim 1, wherein the trampoline code has an expansion mode which allows the trampoline code to access a list of destination branch addresses as possible branch addresses.

8. The method of claim 1, wherein updating the direct call code in the trampoline code template includes updating the trampoline code template while the operating system kernel is running.

9. A system for redirecting an indirect call in an operating system kernel to a direct call, the system comprising:
   memory containing the operating system kernel and one or more user processes in a user space of the kernel;
   one or more CPUs coupled to the memory, the one or more CPUs running the operating system kernel and the one or more user processes, wherein the operating system kernel is configured to:
   while in a learning mode for a trampoline, record, for each of one or more indirect calls, whose code has been replaced with a trampoline code template containing trampoline code for a direct call, an entry in a hash table having a plurality of keys and entries, wherein the recorded entry is a source branch address and a destination branch address for an indirect call and a count of a number of occurrences of the source branch address and the destination branch address, and the hash table key is a bit-wise combination of the source branch address and the destination branch address;
   while in an update mode for the trampoline, update, based on an entry in the hash table, a destination branch address in the direct call code of the trampoline code template associated with the indirect call; and
   while in a use mode for the trampoline, execute the trampoline code to redirect the indirect call to the updated direct call.

10. The system of claim 9, wherein the trampoline code template is installed in the operating system kernel at compile time.

11. The system of claim 9, wherein the trampoline code has fallback code which allows the trampoline code to operate as an indirect call.

12. The system of claim 9, wherein the trampoline code has fallback code which allows the trampoline code to operate as a retpoline, which is a return trampoline that prevents speculative execution until the destination branch address of the indirect call is determined.

13. The system of claim 9, wherein the trampoline code has an expansion mode which allows the trampoline code to access a list of destination branch addresses as possible branch addresses.

14. A non-transitory computer-readable medium comprising instructions executable in a computer system, wherein the instructions when executed in the computer system cause the computer system to carry out a method of redirecting an indirect call in an operating system kernel to a direct call, the method comprising:
   while in a learning mode, recording, for each of one or more indirect calls, whose code has been replaced with a trampoline code template containing trampoline code for a direct call, an entry in a hash table having a plurality of keys and entries, wherein the recorded entry is a source branch address and a destination branch address for an indirect call and a count of a number of occurrences of the source branch address and the destination branch address, and the hash table key is a bit-wise combination of the source branch address and the destination branch address;
   while in an update mode, updating, based on an entry in the hash table, a destination branch address in the direct call code of the trampoline code template associated with the indirect call; and
   while in a use mode, executing the trampoline code to redirect the indirect call to the updated direct call.

15. The non-transitory computer-readable medium of claim 14, wherein the trampoline code template is installed in the operating system kernel at compile time.

16. The non-transitory computer-readable medium of claim 14, wherein the learning mode is operative in response to an epoch event that occurs once every sixty seconds.

17. The non-transitory computer-readable medium of claim 14, wherein the update mode is operative in response to an epoch event that occurs once every second.

18. The non-transitory computer-readable medium of claim 14, wherein the trampoline code has fallback code which allows the trampoline code to operate as an indirect call.

19. The non-transitory computer-readable medium of claim 14, wherein the trampoline code has fallback code which allows the trampoline code to operate as a retpoline, which is a return trampoline that prevents speculative execution until the destination branch address of the indirect call is determined.

20. The non-transitory computer-readable medium of claim 14, wherein the trampoline code has an expansion mode which allows the trampoline code to access a list of destination branch addresses as possible branch addresses.

* * * * *